Figure 1:
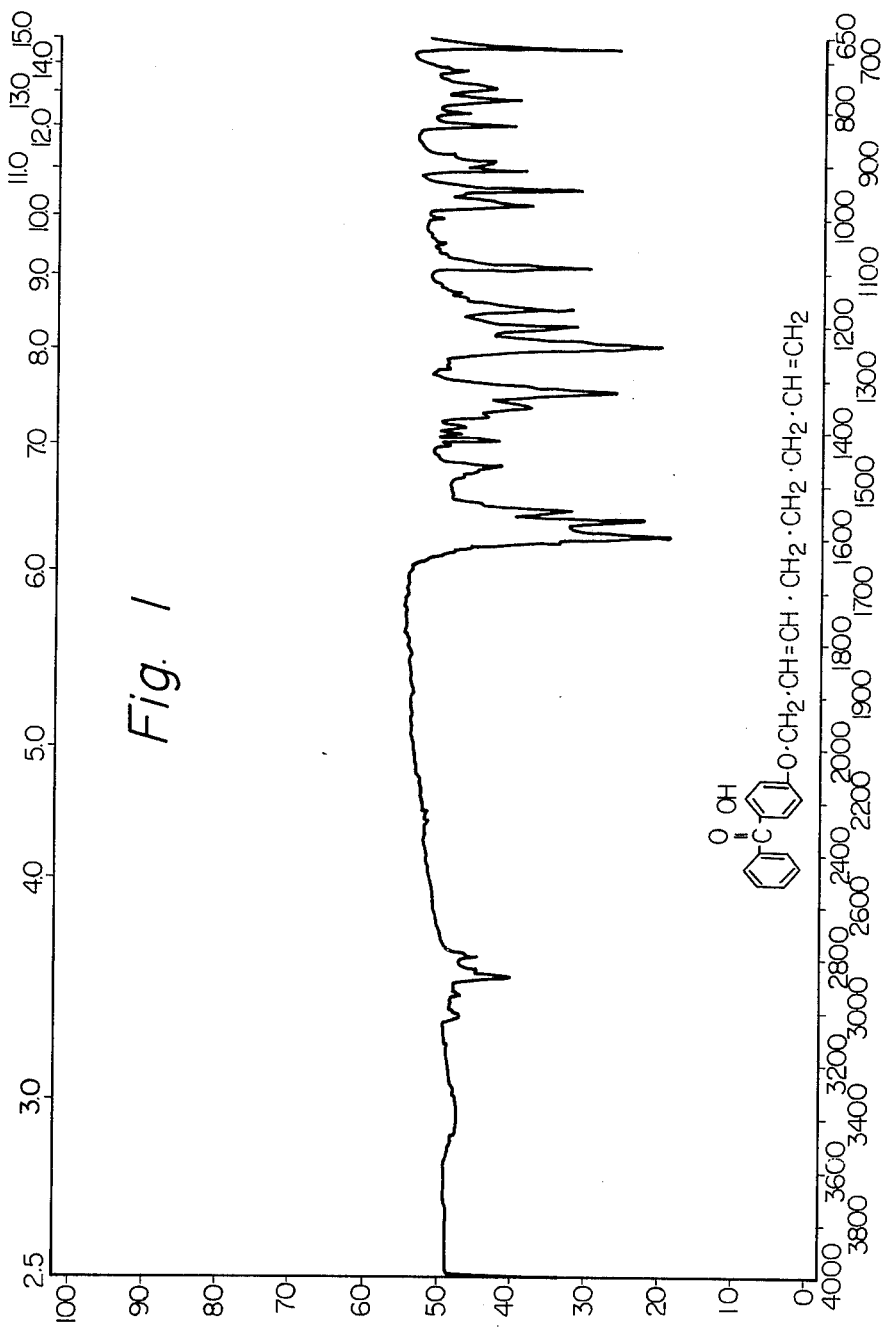

United States Patent [19]
Munakata et al.

[11] 3,879,470
[45] Apr. 22, 1975

[54] BENZOPHENONE DERIVATIVES AND A PROCESS FOR THE PRODUCTION

[75] Inventors: Hiroaki Munakata, Yokohama; Naoshi Imaki, Kawasaki, both of Japan

[73] Assignee: Mitsubishi Chemical Industries Limited, Tokyo, Japan

[22] Filed: July 30, 1973

[21] Appl. No.: 383,909

[30] Foreign Application Priority Data
July 31, 1972  Japan.............................. 47-76732

[52] U.S. Cl............... 260/591; 260/45.95; 252/404
[51] Int. Cl....................... C07c 49/80; C07c 49/82
[58] Field of Search..................................... 260/591

[56] References Cited
OTHER PUBLICATIONS
Hoechst, Chemical Abstracts, 66 3199h, (1967).

*Primary Examiner*—Daniel D. Horwitz
*Attorney, Agent, or Firm*—Bierman & Bierman

[57] ABSTRACT

There is disclosed a novel compound of 2 hydroxy-4-(2,7-alkadienyloxy) benzophenone and its derivatives, and that the product is produced by reacting a 2 hydroxy benzophenone compound with a 1,3-diene compound in the presence of a palladium catalyst.

29 Claims, 2 Drawing Figures

BENZOPHENONE DERIVATIVES AND A PROCESS FOR THE PRODUCTION

This invention relates to novel 2,4-dihydroxybenzophenone derivatives and to a process for the production thereof.

A 2-hydroxy-4-alkoxybenzophenone compound is useful as an ultraviolet absorbing agent; a typical compound is 2-hydroxy-4-octoxybenzophenone. It has already been proposed to produce 2-hydroxy-4-alkoxybenzophenone by reacting 2,4-dihydroxybenzophenone with an alkyl halide in a solvent, such as dimethyl formamide and ethyleneglycol, in the presence of an alkali material, such as a carbonate, bicarbonate and hydroxide of an alkali metal. Such process involves inherent disadvantages in that the solvent employed is decomposed to cause contamination of the product and the process requires the use of an excess of expensive alkyl halide and removal of reaction byproduct derived from such excess alkyl halide from the reaction mass.

Accordingly, an object of this invention is to provide a process for producing an ultraviolet absorbing agent of a benzophenone derivatives which do not have the above-mentioned disadvantages.

A further object is to provide a novel ultraviolet absorbing agent of benzophenone derivatives and a process for the production thereof.

A still further object is to provide a novel process for producing a 2-hydroxy-4-octoxybenzophenone compound without using an octylhalide.

According to this invention, a 2,4-dihydroxybenzophenone compound and a 1,3-diene compound are reacted in the presence of a palladium catalyst to produce a 2-hydroxy-4-alkadienyloxybenzophenone compound in which a linear dimer of such 1,3-diene is attached to the benzophenone nucleus through oxygen atom on 4-position. The product is suitable as it is for use as an ultraviolet absorbing agent; however, it can readily be converted by hydrogenation into 2-hydroxy-4-alkoxybenzophenone which is also a useful ultraviolet absorbing agent.

Throughout the specification and the claims, 2,4-dihydroxybenzophenone compound means a compound having following general formula of

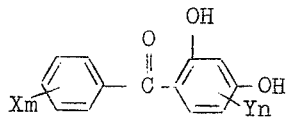

wherein X represents a halogen atom, such as chlorine and bromine, an alkyl group containing 1 to 8 carbon atoms, such as methyl, ethyl, propyl, butyl and octyl group, an alkoxy group containing 1 to 4 carbon atoms, such as methoxy, ethoxy and propoxy group, an alkoxyalkyl group containing 2 to 6 carbon atoms, such as methoxymethyl and ethoxyethyl, and an aryl group containing 6 to 8 carbon atoms, such as phenyl and tolyl group; Y represents an alkyl group containing 1 to 8 carbon atoms, such as methyl, ethyl, propyl, butyl and octyl group; $m$ is an integer of 0, 1 and 2 and $n$ is an integer of 0 and 1, and 1,3-diene compound means a compound having the general formula of

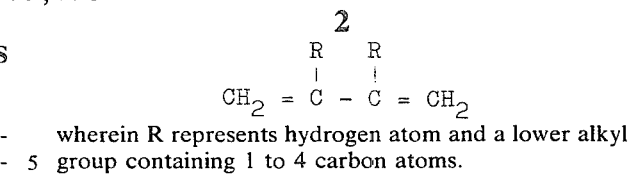

wherein R represents hydrogen atom and a lower alkyl group containing 1 to 4 carbon atoms.

Such 2,4-dihydroxybenzophenone compound is a known compound and is prepared through the Friedel-Crafts reaction, for example, by reacting benzyl halide with resorcine according to the following reaction formula of

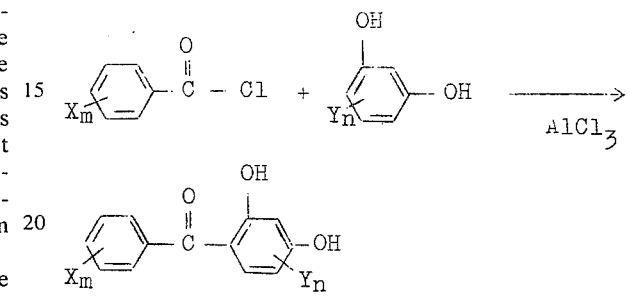

wherein X, Y, $m$ and $n$ have the same meanings as above.

Examples of the 2,4-dihydroxybenzophenone compound include, for instance, 2,4-dihydroxybenzophenone, 2,4-dihydroxy-3-methylbenzophenone, 2,4-dihydroxy-5-methylbenzophenone, 2,4-dihydroxy-4'-methylbenzophenone, 2,4-dihydroxy-4'-chlorobenzophenone, 2,4-dihydroxy-4'-phenylbenzophenone, 2,4-dihydroxy-3',5'-dimethylbenzophenone, 2,4-dihydroxy-3',5'-dichlorobenzophenone, 2,4-dihydroxy-3',5'-dimethoxybenzophenone, 2,4-dihydroxy-3,3',5'-trimethylbenzophenone and 2,4-dihydroxy-3-ethyl-4'-chlorobenzophenone; however, 2,4-dihydroxybenzophenone and 2,4-dihydroxy-3-methylbenzophenone are preferable.

Examples of the 1,3-diene compound include, for instance, 1,3-butadiene, isoprene and 2,3-dimethyl butadiene; however, 1,3-butadiene is preferable.

In the reaction of the 1,3-diene and 2,4-dihydroxybenzophenone compounds, although the molar ratio of the reactants may be selected in any desired range, it is preferable to select a molar ratio of the benzophenone compound to 1,3-diene ranging from 1:1 to 1:10.

According to this invention, the 1,3-diene and 2,4-dihydroxybenzophenone compounds, for example, butadiene and 2,4-dihydroxybenzophenone are reacted, then 2-hydroxy-4-(2,7-octadienyloxy) benzophenone is produced according to the following reaction formula of

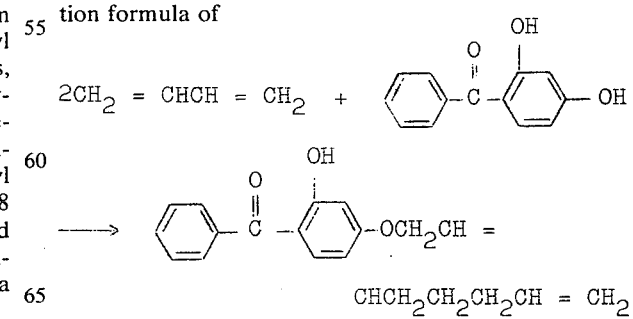

The reaction according to this invention is carried out in the presence of a palladium catalyst. Various palladium compounds can be used as catalyst. Examples of such compound include, for instance, an inorganic salt, such as palladium chloride, palladium iodide, palladium nitrate and palladium sulfate; an organic salt, such as palladium acetate, palladium propionate and palladi m benzoate; a palladium chloride complex salt, such as $Na_2PdCl_4$; a chelate compound such as $Pd(CH_3COCH_2COCH_3)_2$; an organic and inorganic palladium salt complex containing at least one neutral ligands, such as $[P(C_6H_5)_3]_2PdCl_2$, $[P(C_6H_5)_3]_2Pd\ OOCCH_3)_2$, $[P(C_6H_5)_3Pd(OOCCH_3)_2]_2$, $[As(C_6H_5)_3]_2Pd(OOCCH_3)_2$ and $(C_6H_5CN)_2PdCl_2$, $\pi$-allyl palladium complex, such as $(\pi\text{-}C_3H_5)Pd(OOCCH_3)_2$ and $[(\pi\text{-}C_3H_5)PdCl]_2$; and zero valent palladium complex, such as $[P(C_6H_5)_3]_4Pd$, $[P(C_6H_5)_3]_2-$

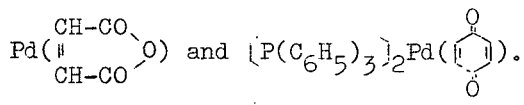

Usually such palladium catalyst is used, as palladium atom, in an amount ranging from $10^{-1}$ to $10^{-5}$ gram atom, preferably from $10^{-2}$ to $5 \times 10^{-3}$ gram atom, per one mole of 2,4-dihydroxybenzophenone.

Where a trivalent phosphorus or arsenic compound capable of coordinating with palladium or a basic alkali metal salt, such as sodium phenoxide, is added to the reaction system, the following advantages are observed; the reaction rate is increased; the stability of the catalyst is improved; and the reaction proceeds smoothly. If an inorganic palladium salt, particularly palladium halide, is used as catalyst, it is preferable to incorporate a basic alkali metal salt, such as sodium phenoxide. Examples of such trivalent phosphorus or arsenic compound include a tertiary phosphine compound, for instance, a trialkyl phosphine having an alkyl group containing 1 to 10 carbon atoms, such as trimethyl-, triethyl- and tri-n-butylphosphine, triphenyl phosphine, a triaryl phosphine having an aryl group substituted with one or more alkyl groups containing 1 to 8 carbon atoms, tricyclohexyl phosphine and diphenyl phosphinoethane; a tertiary phosphite, for instance, triethyl phosphite, tri-n-butyl phosphite, triphenyl phosphite and a compound of

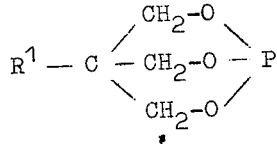

wherein $R^1$ represents an alkyl group containing 1 to 4 carbon atoms. Examples of the basic alkali metal compound include, for instance, a phenoxide, such as sodium phenoxide, lithium phenoxide and potassium phenoxide; an alkoxide containing 1 to 8 carbon atoms, such as sodium methoxide, lithium methoxide, potassium methoxide and sodium butoxide; a carboxylate, such as lithium acetate and sodium propionate; and a carbonate and a hydroxide, such as sodium carbonate and sodium hydroxide.

The amount of such compound or additive to be added to the reaction system per one gram atom of palladium, is usually from 0.1 to 10 moles and preferably 0.5 to 5 moles of the trivalent phosphorus or arsenic compound and 0.1 to 100 moles and preferably 1 to 50 moles of the basic alkali metal salt. Such additives may be used alone or in combination. Where an inorganic palladium salt is employed, a reducing agent, such as formaldehyde, acetaldenyde, hydrazine, sodium borohydride and formic acid, may be added to the system.

In carrying out the reaction according to this invention, any solvent is not necessary; however, the reaction proceeds more smoothly in the presence of any suitable solvent. Examples of the solvent include, for instance, an alcohol, such as isopropyl alcohol and t-butyl alcohol; an ether, such as methyl cellosolve and diethyleneglycol, a ketone, such as cyclohexanone, an aromatic hydrocarbon, such as benzene, toluene and xylene, an N,N-substituted aliphatic amide, such as dimethyl formamide, and dimethylacetamide, an N-substituted lactam, such as N-methyl pyrrolidone, a sulfoxide, such as dimethyl sulfoxide, and a tertiary amine, such as triethyl amines; and preferably, a mixed solvent of an aromatic hydrocarbon and an aprotic polar solvent is employed, the aprotic polar solvents being an N-substituted aliphatic amide, an N-substituted lactam, a sulfoxide and a tertiary amine.

With the use of such mixed solvent, less amount of such palladium compound may be used as catalyst without any adverse affect on the reaction.

Where such mixed solvent is employed, although the amount of the aprotic polar solvent per one mole of the 2,4-dihydroxybenzophenone compound is usually from one to ten moles and preferably one to five moles, the amount of the aromatic hydrocarbon may vary depending upon various factors, such as proportion of reactants and kind of solvent, but it is desirable to maintain the reaction system as a homogeneous solution. In general, the aromatic hydrocarbon is mixed in an amount of 0.5 to 10 times and preferably 1 to 5 times by volume that of the aprotic polar solvent.

According to this invention, the production of the 2-hydroxy-4-alkadienyloxybenzophenone compound is readily carried out by introducing the reactants, 2,4-dihydroxybenzophenone compound and 1,3-diene compound, into a reaction vessel with the solvent and the catalyst, followed by maintaining at a predetermined reaction temperature, usually within a range between 20°C and 160°C and preferably between 40°C and 120°C, for a period of time ranging from few tens minutes to several hours with agitation. The reaction proceeds smoothly under an autogeneous pressure; however it is preferable to carry out the reaction in an atmosphere of an inert gas, such as nitrogen and argon under pressure. After the reaction has been completed, unreacted 1,3-diene compound is removed and the reaction mass is permitted to cool to precipitate crystals of the desired 2-hydroxy-4-alkadienyloxybenzophenone compound. The product thus obtained is a novel compound and is useful as an ultraviolet absorbing agent.

Where such 2-hydroxy-4-alkadienyloxybenzophenone is incorporated into various polymeric materials in an amount of from 0.005 to 10 percent, preferably 0.01 to 5 percent by weight for the polymer, there is observed prevention of degradation of polymeric materials caused by ultraviolet ray, such polymeric material being, for example, a synthetic polymer, e.g. a polyolefin, such as polyethylene and polypropylene, a polyvinyl compound, such as polystyrene and polyvinyl chloride, a polyester, a polyamide and a polyurethane, and a natural polymer, such as cellulose.

The 2-hydroxy-4-alkadienyloxybenzophenone compound produced according to this invention is subjected to a conventional hydrogenation process, then there is obtained a 2-hydroxy-4-alkoxybenzophenone compound which is a known ultraviolet absorbing agent. Therefore, this invention is applicable to a process for producing a 2-hydroxy-4-alkoxybenzophenone compound without using an alkyl halide.

This invention is further illustrated by means of the following Examples; however, it should be understood that this invention is not limited by these Examples.

EXAMPLE 1

Into a 100 ml of shaking pressure vessel was charged a solution of 10.7 g (0.05 mol) of 2,4-dihydroxybenzophenone, 0.022 g (0.1 m mol) of palladium acetate and 0.052 g (0.2 m mol) of triphenylphosphine in 20 ml of dimethyl sulfoxide followed by 10.8 g (0.2 mol) of butadiene. The reaction mass was heated to 80°C at which temperature the reaction was carried out for 1 hour. After completion of the reaction, the vessel was allowed to cool to room temperature and unreacted butadiene was recovered. The reaction mass was admixed with 20 ml of methanol and the resulting mixture was cooled to 0°C to obtain needle crystal precipitate in pale yellow and weighing 12.7 g. The product was identified as 2-hydroxy-4-(2,7-octadienyloxy) benzophenone through infrared spectrum (IR), nuclear magnetic resonance (N.M.R.) spectrum and elementary analysis (E.A.) and the melting point was 53.9° – 55.0°C.

Elementary analysis:
Found:              G 78.48%        H 6.87%
Calculation:        C 78.23%        H 6.88%

I.R. spectrum (cm$^{-1}$)
805 (w), 830 (m), 895 (m), 910 (m), 950 (m), 980 (m),
990 (w), 1090 (m), 1170 (m), 1205 (m), 1240 (s),
1325 (m), 1350 (w), 1410 (w), 1420 (w), 1470 (w),
1550 (m), 1570 (m), 1600 (s), 1610 (m), 2800 (m),
2840 (w), 2870 (m), 2950 (w) and 3020 (w)

Note:  w  weak
       m  medium
       s  strong

Figure 2:
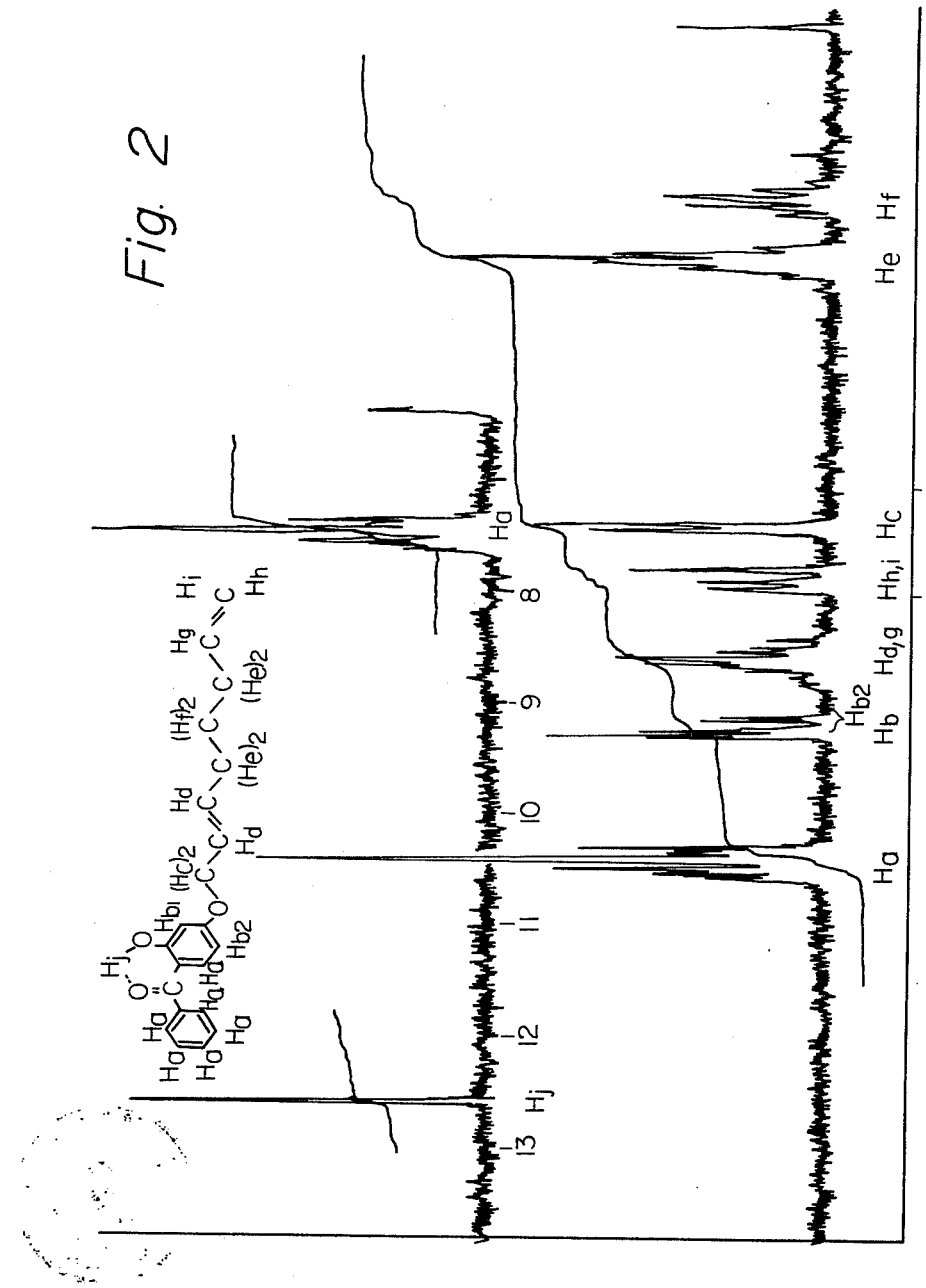

N.M.R. spectrum
1.52 ppm    2H      2.00 ppm    4H
4.4 ppm     2H      4.9 ppm     2H
5.6 ppm     2H      6.3 ppm     2H
7.4 ppm     6H  and 12.6 ppm    1H The I.R. spectrum and N.M.R. spectrum are shown accompanying drawings of FIG. 1 and FIG. 2.

EXAMPLES 2 – 14

The procedures of Example 1 were repeated with exception of changing reaction conditions, catalyst, solvent and reaction time. The conditions and results are given in Table I.

Table I

| Example | Catalyst System | | | Solvent | Reaction time | Yield | |
|---|---|---|---|---|---|---|---|
| | Palladium compound[1] | Ligand | Alkali metal compound | | hour | g | % |
| 2 | Pd(OCOCH$_3$)$_2$ | P(C$_6$H$_5$)$_3$ 0.2mmol | — | t-Butanol | 1 | 6.5 | 40.4 |
| 3 | " | " | — | DMFA[2] | 1 | 8.6 | 53.4 |
| 4 | " | " | — | Benzene | 1 | 1.4 | 8.7 |
| 5 | " | " | — | Methyl cellosolve | 1 | 10.4 | 64.6 |
| 6 | " | " | — | N-methyl pyrrolidone | 1 | 4.8 | 29.8 |
| 7 | " | " | — | Isopropanol | 1 | 4.3 | 26.7 |
| 8 | [(C$_6$H$_5$)$_3$P]$_2$PdCl$_2$ | — | NaOC$_6$H$_5$ 0.5mmol | Isopropanol | 1 | 6.7 | 41.6 |
| 9 | Pd(OCOCH$_3$)$_2$ | As(C$_6$H$_5$)$_3$ 0.2mmol | — | DMSO[3] | 1 | 8.7 | 54.0 |
| 10 | " | — | — | DMSO | 2 | 8.9 | 55.3 |
| 11 | " | C$_2$H$_5$C(CH$_2$O)$_3$P 0.19mmol | — | DMSO | 2 | 8.9 | 55.3 |

Table I — Continued

| 12 | Pd(CH₃COCH₂COCH₃)₂ | — | — | DMSO | 5 | 6.1 | 37.9 |
| 13 | Pd(NO₃)₂ | P(C₆H₅)₃ 0.1 mmol | NaOC₆H₅ 1 mmol | DMSO | 3 | 4.0 | 24.8 |
| 14 | PdSO₄·2H₂O | " | " | DMSO | 3 | 3.5 | 21.7 |

1) In Examples 2 to 7 and 9 to 14, 0.1m mole was used and in Example 8 0.05m mole was used.
2) DMFA: dimethyl formamide
3) DMSO: dimethyl sulfoxide

EXAMPLE 15

Into a 100 ml pressure vessel was introduced a solution of 5.7 g (0.025 mol) of 2,4-dihydroxy-3-methylbenzophenone, 0.011 g (0.05 m mol) of palladium acetate and 0.026 g (0.10 m mol) of triphenyl phosphine in 20 ml of dimethyl sulfoxide and 5.4 g (0.1 mol) of butadiene, and the reaction was carried out at 80°C for 1 hour. After completion of the reaction, the unreacted butadiene was removed, methyl alcohol was added and the mixture was cooled to obtain 3.9 g of needle crystals in reddish orange. The product thus obtained had a melting point of 35° – 38°C and was identified through NMR, IR and EA as 2-hydroxy-3-methyl-4-(2,7-octadienyloxy) benzophenone.

The elementary analysis of the product was:
Found:       C 78.86%    H 7.20%
Calculation: C 78.54%    H 7.19%

EXAMPLES 16 – 27

Using the raw materials, catalysts, reaction conditions and solvents given in Table II, the procedures in Example 1 were repeated. The results are given in Table III.

Table III

| Examples | Conversion[1] | Selectivity[2] | Yield[3] | yield of crystals g | yield of crystals %[4] |
| --- | --- | --- | --- | --- | --- |
| 16 | 99 | 81 | 80 | 15.7 | 65.6 |
| 17 | 98.8 | 80.7 | 79.7 | 16.9 | 70.0 |
| 18 | 96 | 84 | 80 | 10.1 | 65.1 |
| 19 | 99 | 84 | 83 | 9.7 | 63.0 |
| 20 | 99 | 72 | 71 | 9.3 | 59.0 |
| 21 | 78 | 79 | 61 | 7.6 | 48.9 |
| 22 | 56 | 40.2 | 22.4 | 2.1 | 13.8 |
| 23 | 72 | 80 | 58 | 6.63 | 43.4 |
| 24 | — | — | — | 12.8 | 53 |
| 25 | — | — | — | 11.6 | 48 |
| 26 | — | — | — | 2.7 | 11 |
| 27 | 79 | 79 | 62 | — | — |

Note:
1) Conversion was calculated on the basis of the amount of unreacted 2,4-dihydroxy benzophenone measured by gas chromatography (G.C.).
2) Selectivity = yield/conversion × 100
3) Yield was calculated on the basis of the amount of 2-hydroxy-4-(2,7-octadienyloxy) benzophenone in the reaction mass measured by G.C. (for 2,4-dihydroxy benzophenone)
4) Yield of crystals (%) was based on 2,4-dihydroxy benzophenone

EXAMPLE 28

One hundred parts of ethylene-propylene block copolymer and 0.1 part of 2-hydroxy-4-(2,7-

Table II

| Ex. | Raw Materials 2,4-dihydroxy benzophenone m mole | Raw Materials C₄H₆ m mole | Catalyst System palladium acetate m mole | Catalyst System tri-phenyl phosphine m mole | Catalyst System alkali metal compound m mole | Reaction Conditions temp. °C | Reaction Conditions hours hr | Reaction Conditions press. of N₂ kg/cm² | Solvent ml | Solvent ml |
| --- | --- | --- | --- | --- | --- | --- | --- | --- | --- | --- |
| 16 | 75.0 | 450 | 0.015 | 0.06 | 0.30 | 90 | 5.0 | — | benzene 15.0 | DMFA 6.0 |
| 17 | 75.1 | " | 0.016 | 0.061 | 0.05 | " | 4.5 | — | " | " |
| 18 | 50 | 300 | 0.010 | 0.040 | 0.40 | " | 2.5 | — | benzene 10.0 | DMAA 4.5 |
| 19 | " | " | " | " | " | " | 4.0 | 10 | " | N-methyl-pyrroli-done 5.0 |
| 20 | " | " | " | " | trace[2] | " | 3.5 | 20 | " | TEA 6.0 |
| 21 | " | " | " | " | — | " | 4.5 | 10 | " | " |
| 22 | " | " | " | " | 0.40 | " | 3.0 | 20 | methanol 10.0 | " |
| 23 | " | " | 0.015 | " | " | " | " | " |  | cyclo-hexanone 15 |
| 24 | 75 | 445 | " | 0.060 | 0.150 | " | 4 | — | benzene 15 | DMFA 6 |
| 25 | " | 452 | 0.017 | 0.061 | trace[2] | " | 3 | — | " | " |
| 26 | " | 447 | 0.015 | 0.062 | 0.150 | " | 4.5 | — | " | " |
| 27 | " | 450 | 0.010 | 0.04 | 0.04 | " | 6.0 | — | " | " |

Note:
1) Examples 16 – 23: sodium phenoxide
Example 24: lithium acetate
Example 25: sodium hydroxide
Examples 26 – 27: sodium acetate
DMFA: dimethyl formamide
DMAA: dimethyl acetamide
TEA: triethyl amine
2) In Examples 20 and 25, the alkali metal compounds were hardly dissolved into the solvent, accordingly undissolved portions were filtered out. The amount of the alkali metal compounds dissolved in the reaction system were not determined.

octadienyloxy) benzophenone were uniformly admixed and shaped into pellet form.

The pellets were compressed at 230°C to obtain a pressed sheet (thickness being 0.9 mm) from which were stamped specimens (ASTM D-1822 L type) for measurement of their properties. The specimens were subjected to carbon arc lamp irradiation test in a sunshine weathermeter, the temperature of black pannel was 63°C, and every 180 minutes tap water was sprayed on the specimens for 18 minutes. The variation of carbonyl group content of the specimens according to length of irradiation was measured by an infrared absorbing spectrum at 1708 cm$^{-1}$.

For comparison, two kinds of specimens containing no ultraviolet absorbing agent and 0.1 part of ultraviolet absorbing agent which was 2-hydroxy-4-n-octoxybenzophenone available from Osaka Seika Kogyo Kabushiki Kaisha, Osaka, Japan as Seikalizer E, respectively, were subjected to abovementioned degradation test, and the contents of carbonyl group were measured. The results are given in Table IV.

Table IV

| U.V. absorbing agent | Irradiation time (hr) | | |
|---|---|---|---|
| | 0 | 80 | 140 |
| None | 0.45 | 1.00 | 1.72 |
| 2-hydroxy-4-(2,7-octadienyloxy) benzophenone | 0.31 | 0.37 | 0.52 |
| Seikalizer E | 0.32 | 0.42 | 0.63 |

We claim:

1. A 2-hydroxy-4-(2,7-octadienyloxy) benzophenone compound having the general formula of

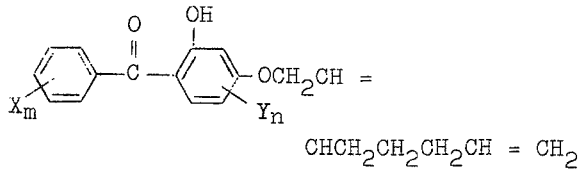

wherein X represents a halogen atom, an alkyl group containing 1 to 8 carbon atoms, an alkoxy group containing 1 to 4 carbon atoms, an alkoxyalkyl group containing 2 to 6 carbon atoms and an aryl group containing 6 to 8 carbon atoms, Y represents an alkyl group containing 1 to 8 carbon atoms, $m$ is an integer of 0, 1 and 2 and $n$ is an integer of 0 and 1.

2. 2-Hydroxy-4-(2,7-octadienyloxy) benzophenone.

3. 2-Hydroxy-3-methyl-4-(2,7-octadienyloxy) benzophenone.

4. A process for producing a 2-hydroxy-4-alkadienyloxybenzophenone compound having the formula of

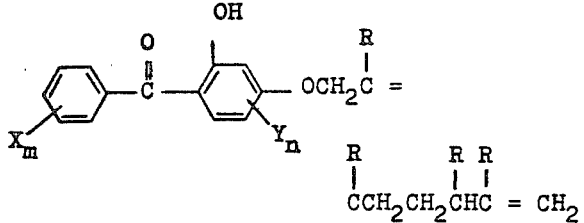

wherein X represents a halogen atom, an alkyl group containing 1 to 8 carbon atoms, an alkoxy group containing 1 to 4 carbon atoms, an alkoxyalkyl group containing 2 to 6 carbon atoms and an aryl group containing 6 to 8 carbon atoms, Y represents an alkyl group containing 1 to 8 carbon atoms, R represents a hydrogen atom and methyl group, $m$ is an integer of 0, 1 and 2 and $n$ is an integer of 0 and 1, which comprises reacting a 2,4-dihydroxybenxophenone compound having the formula of

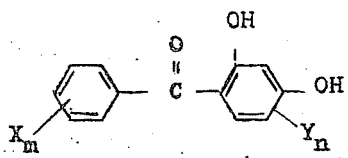

wherein X, Y, $m$ and $n$ have the same meaning as above, with a 1,3-diene compound having the formula of

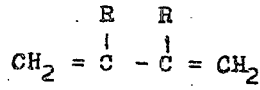

wherein R has the same meaning as above, in the presence of a palladium catalyst selected from the group consisting of an inorganic palladium salt, an aliphatic carboxylate of palladium, an aromatic carboxylate of palladium, a palladium chloride complex salt, a palladium chelate compound, an organic palladium salt complex containing at least one neutral ligand, an inorganic palladium salt complex containing at least one neutral ligand, a π-allyl palladium complex and a zero valent palladium complex.

5. A process for producing 2-hydroxy-4-(alkadienyloxy) benzophenone compound according to claim 4, wherein a neutral ligand selected from the group consisting of a trivalent phosphorus compound and a trivalent arsenic compound is incorporated into said palladium catalyst.

6. A process for producing 2-hydroxy-4-alkadienyloxybenzophenone compound according to claim 4, wherein a basic alkali metal compound selected from the group consisting of an alkali metal phenoxide, an alkali metal alkoxide containing 1 to 8 carbon atoms, an alkali metal carboxylate, an alkali metal carbonate and an alkali metal hydroxide is incorporated into said palladium compound.

7. A process for producing a 2-hydroxy-4-(2,7-octadienyloxy)benzophenone compound having the formula of

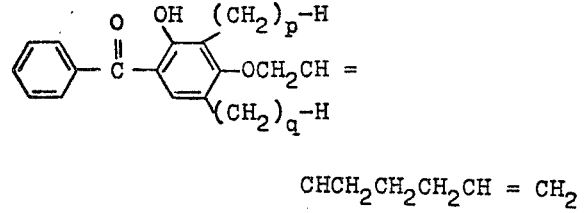

wherein $p$ and $q$ are each an integer of 0 or 1, $p+q=0$ or 1, which comprises reacting, in the presence of a palladium catalyst selected from the group consisting of an inorganic palladium salt, an aliphatic carboxylate of palladium, an aromatic carboxylate of palladium, a palladium chloride complex salt, a palladium chelate compound, an organic palladium salt complex containing at least one neutral ligand, an inorganic palladium salt complex containing at least one neutral ligand, a π-allyl palladium complex and a zero valent palladium complex, at a temperature from 20° to 160°C., a 2,4-dihydroxybenzophenone compound having the formula of

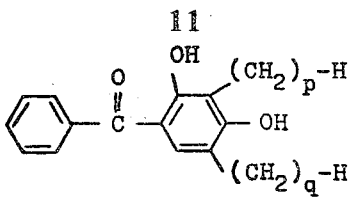

wherein p and q have the same meaning as above, with a 1,3-butadiene.

8. A process for producing a 2-hydroxy-4-(2,7-octadienyloxy) benzophenone compound according to claim 7, wherein a neutral ligand selected from the group consisting of a trivalent phosphorus compound and a trivalent arsenic compound is incorporated into said palladium catalyst.

9. A process for producing a 2-hydroxy-4-(2,7-octadienyloxy) benzophenone compound according to claim 8, wherein said trivalent phosphorus and arsenic compound is a compound having the general formula of $$MR_3$$

wherein M represents an atom of phosphorus and arsenic and R represents an alkyl group containing 1 to 8 carbon atoms and a phenyl group which may be substituted with one or more alkyl groups containing 1 to 8 carbon atoms.

10. A process for producing a 2-hydroxy-4-(2,7-octadienyloxy) benzophenone compound according to claim 7, wherein the reaction is carried out in a solvent.

11. A process for producing a 2-hydroxy-4-(2,7-octadienyloxy) benzophenone compound according to claim 7, wherein said solvent is a mixture of an aromatic hydrocarbon and an aprotic polar solvent.

12. A process for producing a 2-hydroxy-4-(2,7-octadienyloxy) benzophenone compound according to claim 7, wherein the proportion of said palladium catalyst used is from $10^{-1}$ to $10^{-5}$ gram atom of palladium per one mole of said 2,4-dihydroxybenzophenone compound.

13. A process for producing a 2-hydroxy-4-(2,7-octadienyloxy)benzophenone compound according to claim 9, wherein said trivalent phosphorus compound is a triphenylphosphine.

14. A process for producing a 2-hydroxy-4-(2,7-octadienyloxy) benzophenone compound according to claim 7, wherein a basic alkali metal compound selected from the group consisting of an alkali metal phenoxide, an alkali metal alkoxide containing 1 to 8 carbon atoms, an alkali metal carboxylate, an alkali metal carbonate and an alkali metal hydroxide is incorporated into said palladium compound.

15. A process for producing a 2-hydroxy-4-(2,7-octadienyloxy)benzophenone compound according to claim 7, wherein said palladium catalyst is an inorganic palladium salt incorporated with a neutral ligand selected from the group consisting of a trivalent phosphorus compound and a trivalent arsenic compound, and a basic alkali compound selected from the group consisting of an alkali metal phenoxide, an alkali metal alkoxide containing 1 to 8 carbon atoms, an alkali metal carboxylate, an alkali metal carbonate and an alkali metal hydroxide.

16. A process for producing a 2-hydroxy-4-(2,7-octadienyloxy)benzophenone compound according to claim 15, wherein said palladium catalyst is an inorganic palladium salt selected from the group consisting of palladium chloride, palladium iodide, palladium nitrate and palladium sulfate, said neutral ligand is a triphenylphosphine and said basic alkali compound is a sodium phenoxide.

17. A process for producing a 2-hydroxy-4-(2,7-octadienyloxy) benzophenone compound according to claim 7, wherein said palladium catalyst is a palladium carboxylate selected from the group consisting of an aliphatic palladium carboxylate and an aromatic palladium carboxylate.

18. A process for producing a 2-hydroxy-4-(2,7-octadienyloxy) benzophenone compound according to claim 17, wherein said palladium cadalyst is a palladium carboxylate selected from the group consisting of palladium acetate, palladium propionate and palladium benzoate.

19. A process for producing a 2-hydroxy-4-(2,7-octadienyloxy)benzophenone compound according to claim 18, wherein a triphenylphosphine is incorporated into said palladium catalyst.

20. A process for producing a 2-hydroxy-4-(2,7-octadienyloxy)benzophenone compound according to claim 19, wherein a sodium phenoxide is incorporated into a triphenylphosphine.

21. A process for producing a 2-hydroxy-4-(2,7-octadienyloxy)benzophenone compound according to claim 7, wherein said palladium catalyst is a palladium chelate compound.

22. A process for producing a 2-hydroxy-4-(2,7-octadienyloxy) benzophenone compound according to claim 21, wherein said palladium chelate compound is palladium acetylacetonate.

23. A process for producing a 2-hydroxy-4-(2,7-octadienyloxy)benzophenone compound according to claim 7, wherein said palladium compound is a palladium salt complex containing at least one neutral ligand.

24. A process for producing a 2-hydroxy-4-(2,7-octadienyloxy)benzophenone compound according to claim 23, wherein said palladium compound is a palladium salt complex selected from the group consisting of [P(C₆H₅)₃]₂PdCl₂, [P(C₆H₅)]₂Pd(OOCCH₃)₂, [P(C₆H₅)₃Pd(OOCCH₃)₂]₂, [As(C₆H₅)₃]₂Pd(OOCCH₃)₂, (C₆H₅CN)₂PdCl₂, a π-allyl palladium complex and a zero valent palladium complex.

25. A process for producing a 2-hydroxy-4-(2,7-octadienyloxy)benzophenone compound according to claim 7, wherein said palladium compound is a π-allyl palladium complex.

26. A process for producing a 2-hydroxy-4-(2,7-octadienyloxy)benzophenone compound according to claim 25, wherein said palladium compound is a π-allyl palladium complex selected from the group consisting of (π-C₃H₅)Pd(OOCCH₃)₂ and [(π-C₃H₅)PdCl]₂.

27. A process for producing a 2-hydroxy-4-(2,7-octadienyloxy) benzophenone compound according to claim 7, wherein said palladium compound is a zero valent palladium complex.

28. A process for producing a 2-hydroxy-4-(2,7-octadienyloxy)benzophenone compound according to claim 27, wherein said palladium compound is a zero valent palladium complex selected from the group consisting of [P(C₆H₅)₃]₄Pd,

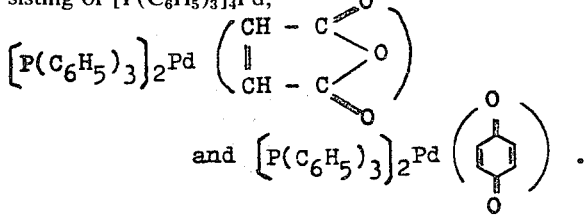

29. A process for producing a 2-hydroxy-4-(2,7-octadienyloxy)benzophenone compound according to claim 7, wherein the reaction is carried out in a molar proportion of said 2,4-dihydroxybenzophenone compound to said 1,3-butadiene of from 1:1 to 1:10.

* * * * *